US005538742A

United States Patent [19]
McHale et al.

[11] Patent Number: 5,538,742
[45] Date of Patent: Jul. 23, 1996

[54] MULTI-PHASE SHEETED CHEWING GUM AND METHOD AND APPARATUS FOR MAKING

[75] Inventors: Michael McHale, Aurora; George Nichtula, Westmont; Christine L. Corriveau, Orland Park; William J. Wokas, Bolingbrook, all of Ill.

[73] Assignee: Wm. Wrigley Jr. Company, Chicago, Ill.

[21] Appl. No.: 459,827

[22] Filed: Jun. 2, 1995

Related U.S. Application Data

[62] Division of Ser. No. 44,240, Apr. 7, 1993.

[51] Int. Cl.$^6$ ............... A23G 3/00; A23G 3/06; A23G 3/12; A23G 3/30
[52] U.S. Cl. ............... 426/5; 426/103; 426/249; 426/279; 426/281; 425/130; 425/335; 425/363; 425/375; D1/127
[58] Field of Search ............... 426/5, 103, 249, 426/279, 281; 425/130, 335, 363, 375; D1/127

[56] References Cited

U.S. PATENT DOCUMENTS

| | | | |
|---|---|---|---|
| D. 271,344 | 11/1983 | Faust | D1/12 |
| D. 271,439 | 11/1983 | Schumacher | D1/12 |
| D. 271,534 | 11/1983 | Huzinec | D1/12 |
| D. 271,535 | 11/1983 | Huzinec | D1/12 |
| 1,414,022 | 4/1922 | Huston | 426/94 |
| 1,771,506 | 7/1930 | Mustin . | |
| 1,855,145 | 4/1932 | Jones . | |
| 3,570,417 | 3/1971 | Herrmann et al. | 107/54 |
| 4,352,823 | 10/1982 | Cherukuri et al. | 426/5 |
| 4,352,824 | 10/1982 | Puglia et al. | 426/5 |
| 4,399,154 | 8/1983 | Puglia et al. | 426/5 |
| 4,855,146 | 8/1989 | Murakami et al. | 426/5 |
| 4,882,172 | 11/1989 | Van Alstine | 425/113 |
| 4,882,175 | 11/1989 | Ream et al. | 426/5 |
| 4,925,380 | 5/1990 | Meisner | 425/131.1 |
| 4,940,594 | 7/1990 | Van Alstine | 426/231 |
| 4,971,806 | 11/1990 | Cherukuri et al. | 426/5 |
| 5,019,404 | 5/1991 | Meisner | 426/249 |

FOREIGN PATENT DOCUMENTS 3516852  11/1985  Germany ............... A23G 3/30

Primary Examiner—Donald E. Czaja
Assistant Examiner—Curtis E. Sherrer
Attorney, Agent, or Firm—Maxwell J. Petersen; Willian Brinks Hofer Gilson & Lione

[57] ABSTRACT

The invention is a multi-phase, sheeted chewing gum product, a method and an apparatus for making such a product. The product includes a first mass of a chewing gum formed in a generally flat sheet and a second mass of a confectionery product having a different color than the first mass. The second mass is smaller than the first mass and is embedded in the first mass so as to be visible with the first mass from the top surface of the chewing gum. The method includes the steps of forming the first mass into a slab with a generally flat surface. The second mass is formed into at least one piece which is brought into contact with the flat surface. The slab and the piece are pressed to produce a generally flat sheet which is cut into segments of a desired width, length and shape.

32 Claims, 8 Drawing Sheets

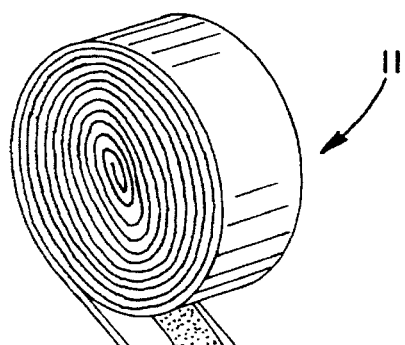
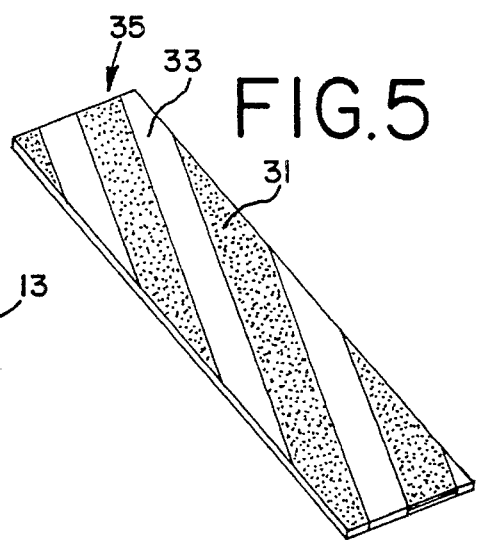
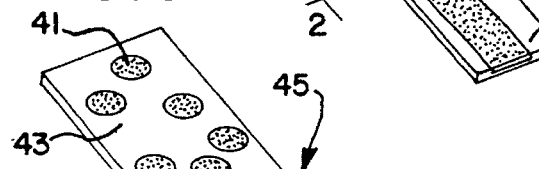
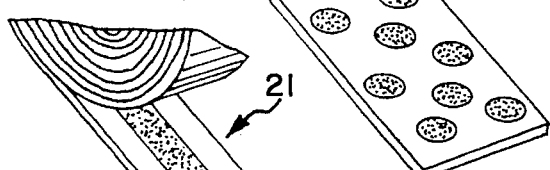
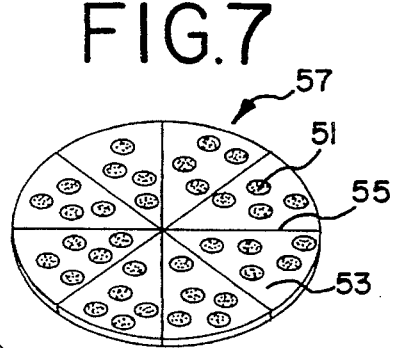
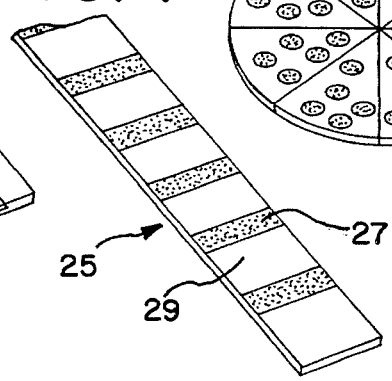

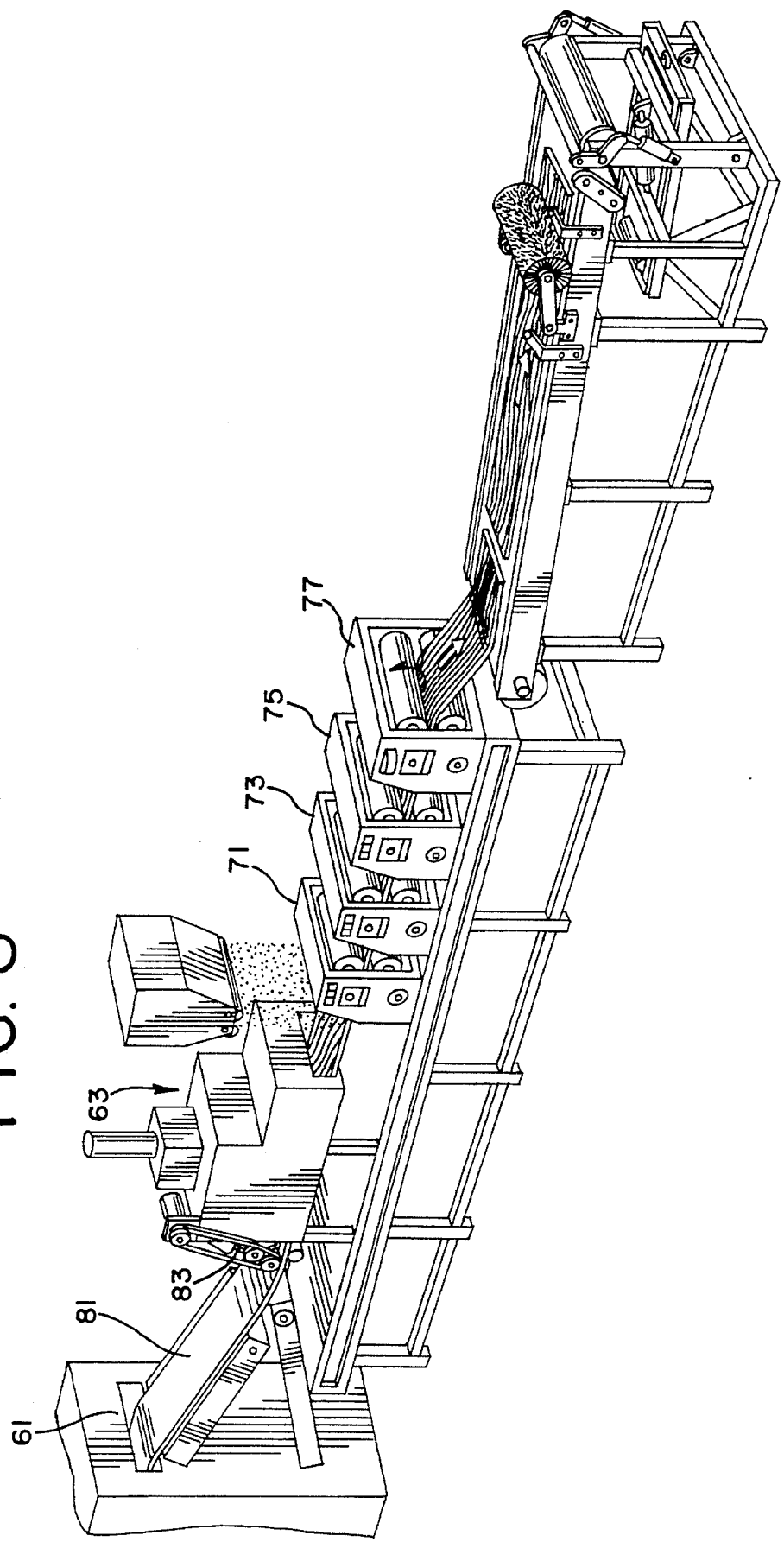

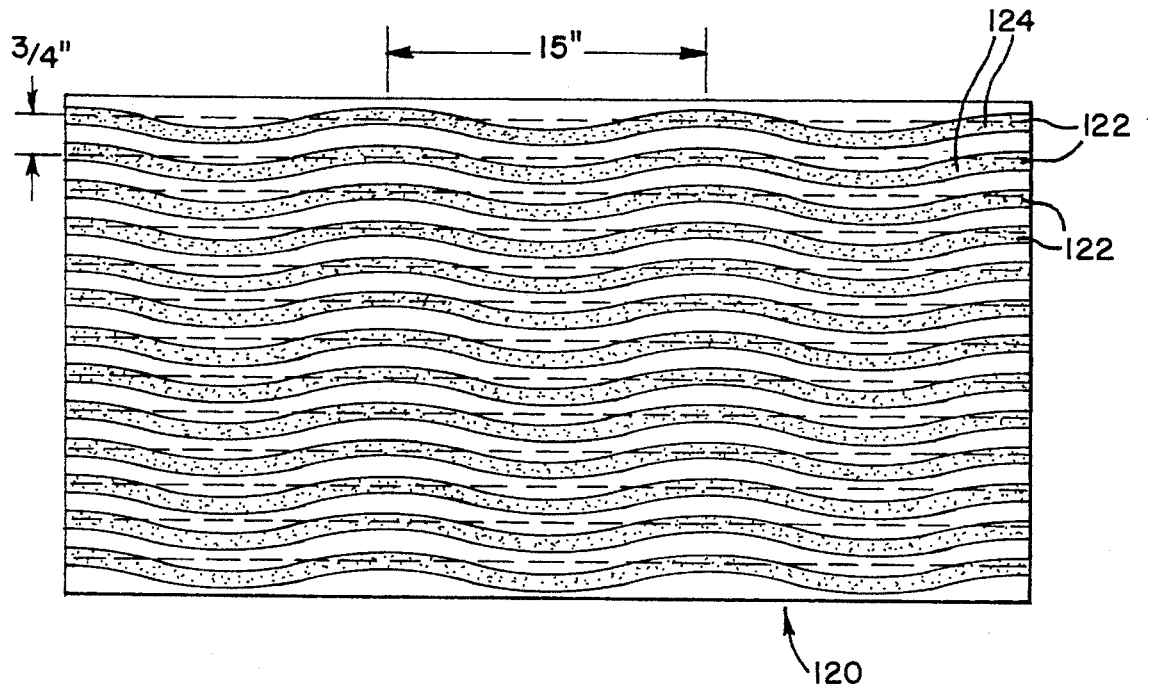
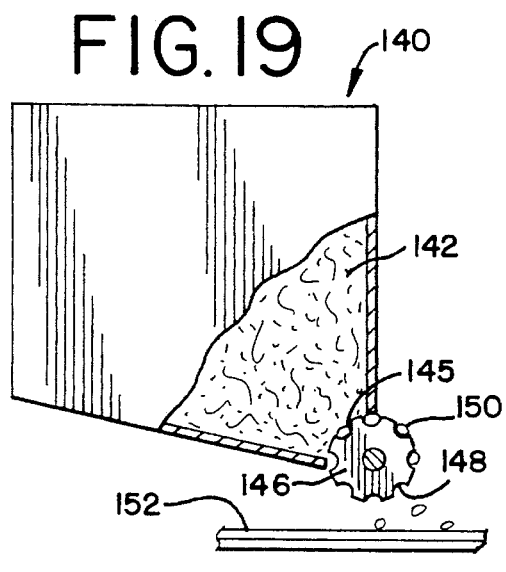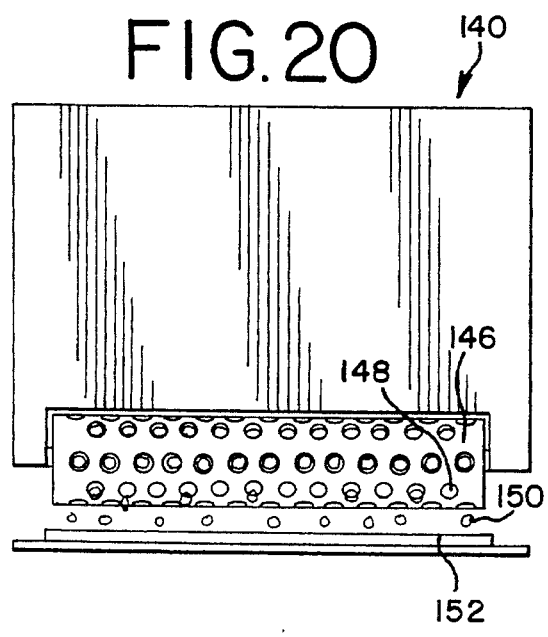

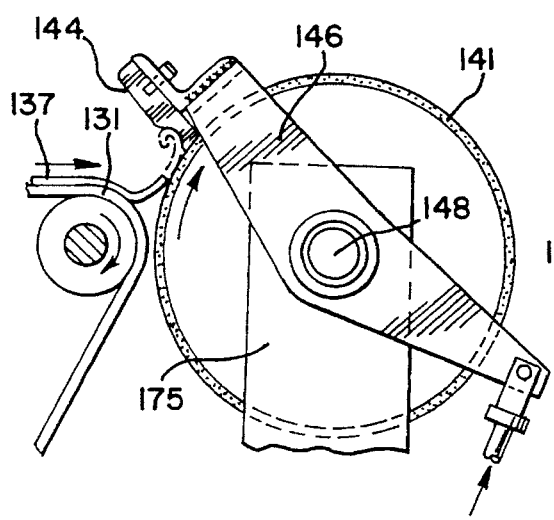
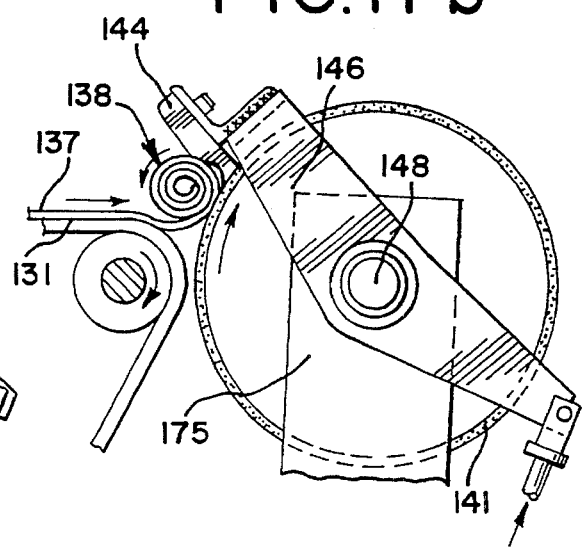
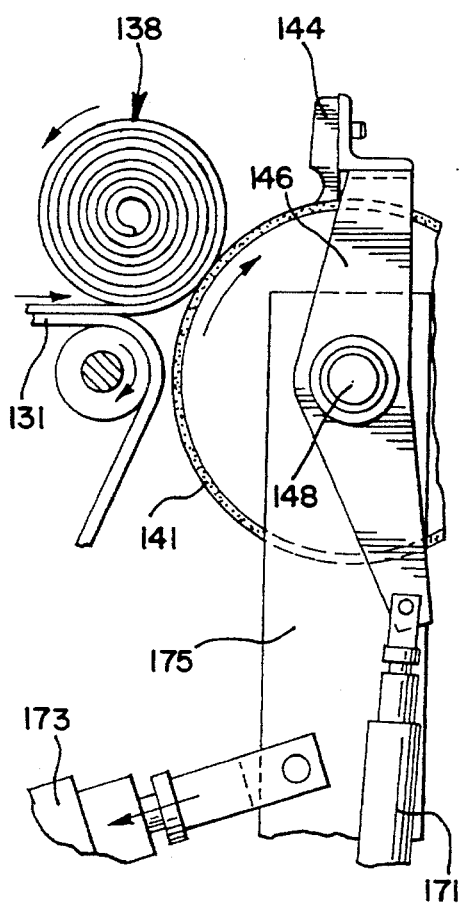
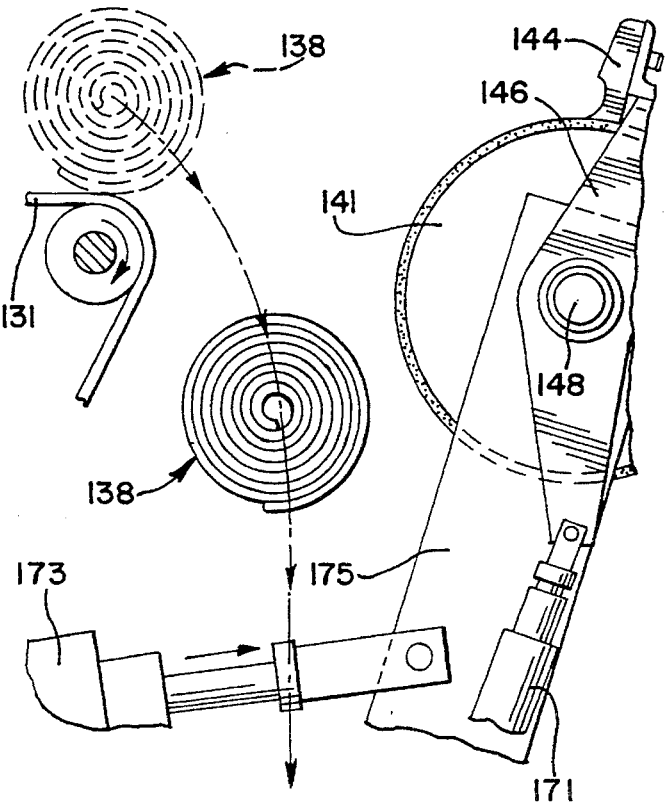

5,538,742

1

MULTI-PHASE SHEETED CHEWING GUM AND METHOD AND APPARATUS FOR MAKING

This application is a division of application Ser. No. 08/044,240, filed Apr. 7, 1993, (pending).

BACKGROUND OF THE INVENTION

The present invention relates to the field of chewing gum. More particularly, the present invention relates to sheeted chewing gum which includes more than one component, such as different colors, flavors and/or sweeteners.

It is generally known that novel forms of chewing gum are popular with consumers. Over the years, several novel chewing gum and confection products have been introduced. These novel products have utilized various combinations of flavors, types, shapes, texture and or packaging to interest the consumer. For example, a product sold under the trademark "BUBBLE TAPE®" bubble gum and made by the process described in U.S. Pat. No. 4,882,175 is a six foot roll of bubble gum rolled up in a tape.

Other novel chewing gum products include the product described in U.S. Pat. No. 4,902,519 is commercially available under the name "Thumb Suckers®" confectionery. This product includes a hard candy sucker in an elastic mold with a bubble gum seal at the bottom of the mold. Still another example is a product known as "Blow Pops" confectionery which includes a mass of chewing gum surrounded by a hard candy sucker. Another example of a novel product is that sold under the name "Tidal Wave®" confectionery which is a cube of chewing gum with a hollow center filled with a liquid confection, which liquid confection typically has a recognizable flavor, different from or the same as the chewing gum.

Various attempts to achieve novel appearances of a chewing gum product have been made. For example, several colorants have been used to achieve desired color characteristics. Also, a product sold under the name "Fruit Stripes®" chewing gum by Beechnut is printed with a dye so as to have colored stripes running diagonally across a stick of chewing gum.

SUMMARY OF THE INVENTION

Briefly stated, the invention is a multi-phase, sheeted chewing gum product, a method and an apparatus for making such a product.

The product includes a first mass of a chewing gum formed in a generally flat sheet and a second mass of a confectionery product having a different color than the first mass. The second mass is smaller than the first mass and is embedded in the first mass so as to be visible with the first mass from the top surface of the chewing gum.

In accordance with a preferred embodiment, the confectionery product is also chewing gum with a different color as well as a different flavor. Also, the product is preferably in the form of a rolled tape with undulating stripes of the second chewing gum running the length of the tape.

The method of the invention includes the steps of forming a first mass of chewing gum into a slab with a generally flat surface. A second mass of a confectionery material is formed into at least one piece which is brought into contact with the flat surface. The slab and the piece are pressed to produce a generally flat sheet. The flat sheet is cut into segments of a desired width, length and shape. Each segment includes

2 some of the first mass with some of said second mass embedded therein and visible with the first mass from the top surface.

In accordance with the preferred method, the confectionery material is chewing gum which is extruded into a plurality of ropes which are laid on top of the first mass in an undulating pattern.

The apparatus of the invention includes means for forming a first mass of chewing gum into a slab with at least one generally flat surface. There is also means for placing at least one piece of a second mass of a confectionery material in contact with the generally flat surface and means for pressing the first and second masses into a generally flat sheet. Means are provided for cutting the generally flat sheet into pieces of chewing gum having the desired size and shape and so as to include some. of said first and some of said second mass of chewing gum.

In accordance with a preferred apparatus, there is provided means for extruding a plurality of ropes of a second chewing gum and means for oscillating these ropes a distance across the width of the first slab as it passes beneath so as to produce an undulating pattern of the second chewing gum in the first slab.

One advantage of the product of the present invention is that it is a chewing gum product with a novel appearance. In addition to the novel appearance, the preferred product which includes a second chewing gum with a different flavor provides a vehicle for novel flavor combinations and taste experience for the consumer as the flavors mix when the product is chewed.

An advantage of the method and apparatus of the present invention is that they can be used by modifying conventional gum making methods and apparatus to produce this chewing gum product with a novel appearance.

It is noted that, as used herein, the term chewing gum is intended to have a relatively broad interpretation, including all forms of chewing gum such as bubble gum.

It is noted that, as used herein, the term "confectionery product" is a relatively generic term and is intended to include such products as chewing gum, taffy, marshmallow, chocolate, nougat, gelatin based and starch based candy, and the like.

It is also noted that, as used herein, the term "strip," as in "strip of chewing gum," is intended to have a relatively broad meaning including conventional sticks of chewing gum as well as extra long strips, for example, the 6 foot long strips known as Bubble Tape® bubble gum.

It is further noted that, unless otherwise indicated, all percentages are given as percentages by weight of the composition.

The present invention, together with attendant objects and advantages, will be best understood with reference to the detailed description below and the attached drawings.

BRIEF DESCRIPTION OF THE DRAWINGS

FIG. 1 is a perspective view of a rolled up tape of multi-colored bubble gum made according to the most preferred embodiment of the present invention.

FIG. 2 is a cross-sectional view along line 2—2 of FIG. 1.

FIG. 3 is a perspective view of a rolled up tape of bubble gum made according to an alternative embodiment of the present invention.

FIG. 4 is a perspective view of a stick of chewing gum with stripes of the second chewing gum across the width of the stick.

FIG. 5 is a perspective view of a stick of chewing gum made with stripes of the second chewing gum running diagonally across the stick.

FIG. 6 is a perspective view of a stick of chewing gum with round bits of a second chewing gum embedded therein.

FIG. 7 is a perspective view of a chewing gum disk made according to an alternative embodiment of the present invention.

FIG. 8 is a perspective view of the extruding, sheeting and rolling apparatus of the most preferred embodiment of the present invention.

FIG. 13 is a top view of a sheet of multi-colored chewing gum before being separated into strips.

FIGS. 17a–17d are a series of side views showing the operations of the rotating drum and curling plate shown in FIG. 14.

FIG. 19 is a cut away view of a device for depositing bits of a second chewing gum on a slab of a first chewing gum in an alternative embodiment of the present invention.

FIG. 20 is a front view of the device shown in FIG. 14.

DETAILED DESCRIPTION OF THE PREFERRED EMBODIMENTS

Figure 9:
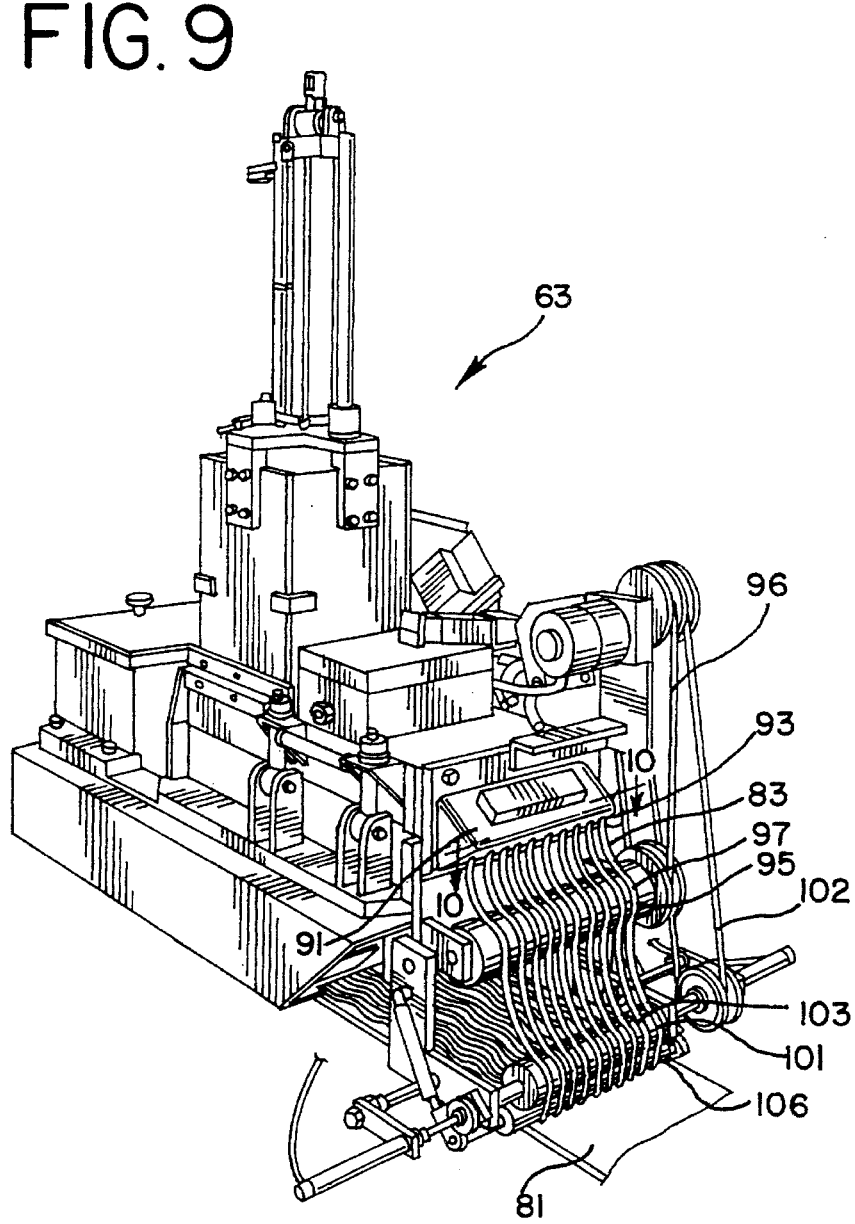
FIG. 9 is a perspective view of the second chewing gum extruder used in the apparatus of the preferred embodiment.
Figure 10:
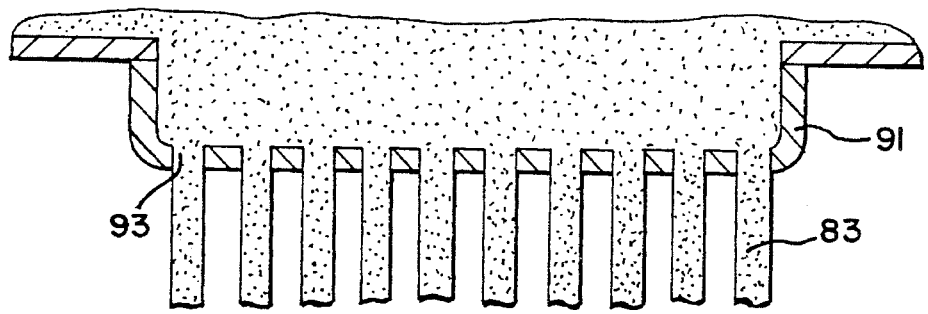
FIG. 10 is a cross-sectional view along line 10—10 of FIG. 9.

Referring to FIG. 1, the multi-colored sheeted chewing gum product 11 of the most preferred embodiment is shown. As can be seen, the most preferred form is that of a rolled up tape such as that described in U.S. Pat. No. 4,882,175, the entire disclosure of which is incorporated herein by reference.

Referring also to the cross-section in FIG. 2, it can be seen that this novel chewing gum product includes a first mass of chewing gum 13 and a second mass of a confectionery product 15 which has a different color from the first mass and which is embedded in and visible from the top surface of the first mass. When the gum is cut through a stripe of the second mass, the second mass may be visible from a side edge, such as shown at 17. Preferably, the second mass is not visible from the bottom surface of the gum product.

The second mass is formed from a confectionery product. The confectionery product can be selected from a wide variety of products so long as it is compatible with the chewing gum in the first mass. Preferably, the confectionery product is chewing gum. More preferably, the chewing gum is a bubble gum of a similar formulation to that of the first mass.

One feature of the product of the present invention is that it is multi-colored, that is the second mass has a different color from the first mass. Preferably, the colors are selected so as to show a distinct contrast. Also, the colors are preferably selected so as to represent the flavors of the first and second masses.

Preferably, the chewing gum of the first mass and the confectionery product of the second mass are formulated so as to not only have different colors, but to also have different flavors. Most preferably, the flavors are selected so as to compliment each other.

The most preferred pattern is shown in FIG. 1, that is an undulating, wavy pattern of the second mass running generally along the length of the first mass. The method of producing this pattern will be discussed in detail below.

An alternative pattern is shown in FIG. 3 which shows a tape of bubble gum 21 with a relatively straight stripe 23 of a second color of chewing gum embedded in the first mass 24 and running the length of the tape.

Another alternative pattern is shown in FIG. 4 which shows a stick of chewing gum 25 with stripes 27 of a second color of chewing gum embedded in the first mass 29, with the stripes 27 running across the width of the stick.

Still another alternative pattern is shown in FIG. 5 which includes diagonal lines 31 of the second mass embedded in the first mass 33 to make a diagonally striped stick of chewing gum 35.

Another alternative pattern is shown in FIG. 6 and includes bits of the second mass 41 embedded in the first mass 43 to make the speckled or spotted stick of chewing gum 45. Although round bits of the second mass are shown in FIG. 6, other shapes of the second mass, regular or irregular, can be embedded. Also, although bits of a single color and flavor are presently preferred, the bits can have different colors and flavors to create an even more unique look and flavor experience.

FIG. 7 shows yet another alternative embodiment, similar to that shown in FIG. 6 with the exception that instead of being cut into a stick, the sheeted chewing gum with the first mass 53 and the bits of the second mass 51 is formed into a disk 57. For example, the sheeted chewing gum can be scored by circular dies and then separated into disk shaped pieces. In addition, each disk is most preferably also scored along lines 55 to create the look of pizza slices. Disks with slice scores formed from single bubble gum mass have been commercially available under the name "Domino's Pizza® Bubble Gum". As with the embodiment shown in FIG. 6, it is preferred to use bits of a single color and flavor. However, the bits can also be made in different colors and flavors.

In accordance with the method of the present invention, a first mass of chewing is formed into a slab. The chewing gum in this first mass can be any variety of chewing gum that can be formed into a slab and pressed. Preferably, the chewing gum is a conventional bubble gum formulation including gum base, sweeteners such as powdered sugar and corn syrup, colors and flavors. The exact formulation of the bubble gum is not deemed critical to the invention. The most preferred formulation for the bubble gum in the first mass is as follows:

| Ingredient | Wt. % |
| --- | --- |
| Lecithin | 0.61 |
| Glycerin | 3.0 |
| Powdered Sugar | 68.48 |
| Corn Syrup | 8.49 |
| Gum Base | 17.70 |
| Flavors | 0.70 |
| Citric Acid | 0.29 |
| Colors | 0.11 |
| Encapsulated, ASPARTAME ® high intensity sweetener (78% active) | 0.12 |
| Encapsulated, ACESULFAME K ® high intensity sweetener (25% active) | 0.50 |
| Total | 100.00 |

This bubble gum formulation for the first mass is put together and mixed by conventional methods in conventional apparatus.

Referring to FIG. 8, this first mass of chewing gum is formed into a slab 81 with a generally flat top surface. This can be accomplished by various methods. Preferably, this is accomplished by a conventional method in a conventional apparatus such as that shown in FIG. 8 at numeral 61. For example, a chewing gum extruder such as that sold by TOGUM under the designation TOE 160 is well suited to form the first mass of chewing gum into a slab. In this type of apparatus, the chewing gum is extruded into a slab about 12 inches wide and about ⅜ of an inch thick. As is typical of chewing gum extruding operations, the mass of chewing gum is preferably heated, most preferably at a temperature of about 140° F.

After the first mass is formed into a slab with a generally flat top surface, at least one piece of a second mass of a confectionery product is brought into contact with the flat surface. Preferably, this is accomplished by extruding multiple, continuous ropes 83 (see FIG. 9) of the second mass and laying those ropes on top of the slab 81. Alternatively, individual pieces, bits or cut ropes of the second mass can be placed on top of the slab.

As stated above, the second mass is preferably chewing gum, most preferably bubble gum. Except for the color, the chewing gum in the second mass may have a formulation identical or at least similar to that of the first mass. However, it has been found to be advantageous to modify the formulation of the first mass so as to make the second mass more easily extruded and stretched. Most preferably, the formulation of the second mass is as follows:

| Ingredient | Wt. % |
| --- | --- |
| Lecithin | 0.53 |
| Glycerin | 3.50 |
| Powdered Sugar | 65.92 |
| Corn Syrup | 8.59 |
| Gum Base | 20.57 |
| Flavors | 0.78 |
| Colors | 0.11 |
| Total | 100.00 |

As can be seen, the most preferred bubble gum formulation used for the second mass is similar to that of the first mass except that the citric acid and high potency sweeteners are not added. Also, the most preferred formulation for the second mass includes a slightly higher amount of gum base. To date, it has been found that a formulation without acid extrudes and stretches better in the apparatus described below.

The apparatus for forming the ropes 83 is shown at 63 in FIG. 8 and in more detail in FIGS. 9, 10, 11 and 12. Preferably, this second extruder 63 is a modified version of a conventional extruder which uses an auger to extrude chewing gum through a die. In particular, the extruder 63 is equipped with a die 91 with multiple outlets 93 through which a plurality of continuous ropes 63 of the second mass are extruded. Although the size of the outlets will vary depending on the desired size of the ropes, the most preferred outlets are round with a diameter of about 0.25 inches.

As is common in extruding chewing gum, it is preferable to heat the chewing gum in the second extruder, most preferably to a temperature between about 120° and about 140° F.

After exiting the die 91, the ropes pass over a roller 95 which is made with circumferential grooves 97 to receive the ropes 83. The roller 95 has a surface of Teflon® and is rotated about its axis by belt 96.

After passing over the roller 95, the ropes 83 pass over the roller 101 which also includes circumferential grooves 103. This roller 101 also includes a surface of Teflon and is rotated about its axis by belt 102.

After passing over the roller 101, the ropes 83 pass under the roller 106, which roller has a surface of Teflon but does not include circumferential grooves. As shown, the roller 106 is preferably biased toward the first slab by a pair of half inch air cylinders 120, most preferably with about 30 P.S.I. of pressure. In this most preferred embodiment, the ropes are flattened somewhat and pressed about half way into the first slab by the roller 106.

Figure 11:
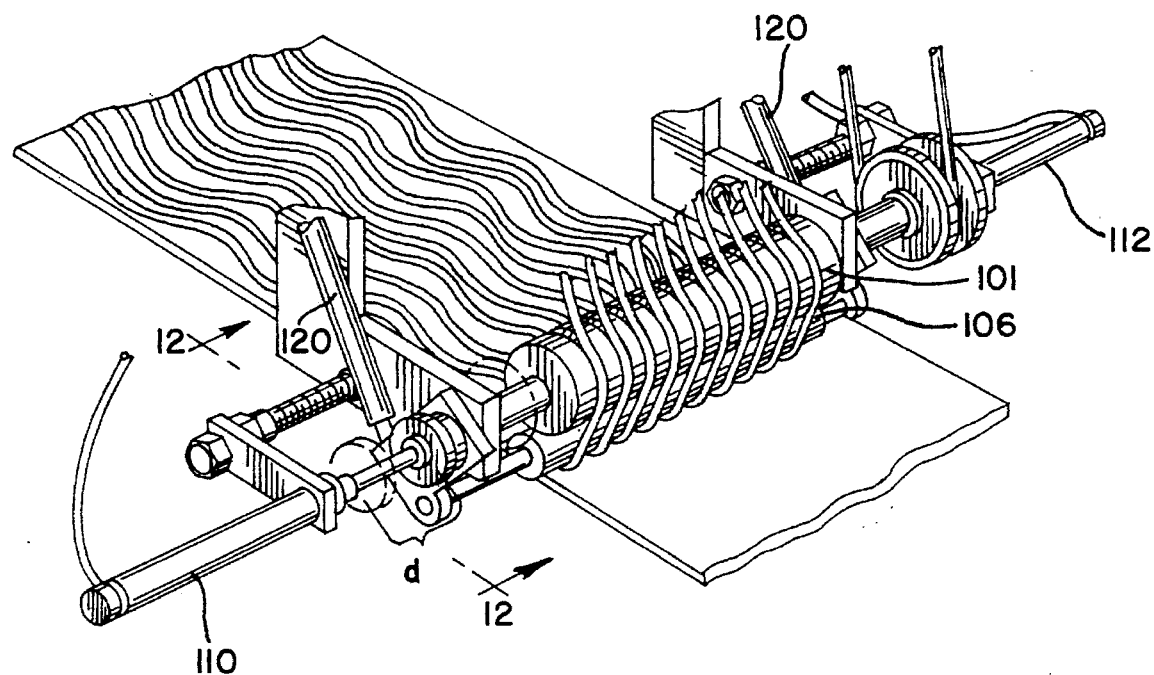
FIG. 11 is a perspective view of the means for undulating and pressing the streams of the second-chewing gum in the preferred embodiment.

As best seen in FIG. 11, the most preferred embodiment includes means for oscillating the ropes 83. This is accomplished by pushing the roller 101 back and forth a distance d across the width of the first slab while the ropes are held in the circumferential grooves 103. As a result, the ropes are laid down on the slab in an undulating or wavy pattern. The most preferred method of oscillating the roller 101 is to use pneumatic pistons 110 and 112 operated by timed valves to thereby alternatingly push the roller 101 back and forth the distance d across the slab. Preferably, the distance of oscillation is between about 1 and about 3 inches, most preferably 2 inches.

Most preferably, the auger (not shown) of the extruder 63 is adjusted so as to extrude the ropes 83 at a linear rate about two thirds that of the slab as it passes below. Also, the angular speed of each of the rollers 95 and 101 is adjusted to account for these different speeds. As a result, the ropes 63 are drawn and made thinner between exiting the die and being pressed into the slab. Most preferably, the ropes are extruded at a speed of about 12 feet per minute and the slab is moving at about 18 feet per minute. As a result, the ropes go from a diameter of about 0.25" as they exit the die to a diameter of about 0.125" as they are pressed into the slab.

Preferably, the second mass of a confectionery product will comprise between about 2 and about 30 percent by weight of the total product, more preferably between about 4 and about 20 percent, even more preferably between about 5 and about 10 percent, and most preferably about 8.65 percent.

After the slab and ropes are brought together, they pass underneath a device (not shown) which applies a dusting compound to the gum. Preferably, the device is one such as is customarily used in gum sheeting operations, and the dusting compound is corn starch such as is also customarily used. Naturally, other dusting compounds such as talc may also be used.

Most preferably, the dusting compound is applied at this point in the line, namely after the first mass and second mass are brought together. In this way, it is difficult, if not impossible, for the consumer to separate the two masses in the final product: Alternatively, a dusting compound can be applied to the top of the slab before the ropes of the second mass are applied. When this is done, the stripes of the second mass can be peeled out of the first mass in the final product. Currently, this is considered less desirable.

After the dusting compound is applied, the slab and the ropes pass through a series of rollers 71, 73, 75 and 77 which further flatten the slab and ropes, trim the width of the resultant sheet and score the sheet in the desired dimensions to produce the strips of chewing gum. Collectively, this series of rollers is referred to as a chewing gum sheeting machine.

FIG. 13 shows a sheet 120 of multi-colored chewing gum after it exits the last roller 77 shown in FIG. 8. This sheet has been fully flattened, trimmed and scored so that it can be separated into the desired size and shape for the final piece of chewing gum. If the desired form is a rolled up tape, the sheet is scored lengthwise at 0.75 inch intervals. If the desired form is a conventionally sized stick of chewing gum, the sheet is scored the same lengthwise and also scored at 3 inch intervals across its width.

Figure 12:
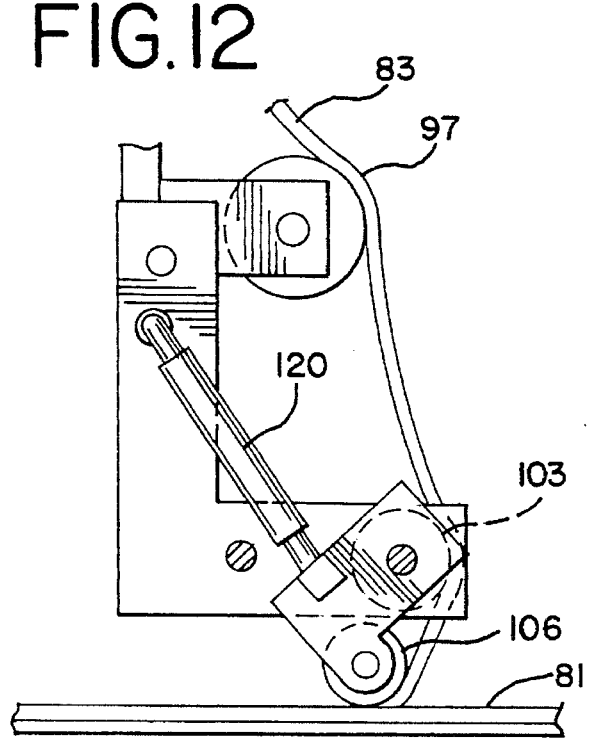
FIG. 12 is a cross-sectional view along line 12—12 of FIG. 11.

As can be seen in FIG. 12, after exiting the sheeting machine, the ropes of the second mass of chewing gum have been flattened into the first mass. Also, because the sheet has been flattened and stretched, the stripes 124 of the second mass have been widened and the undulations have been stretched out lengthwise. In addition, the score lines 122 pass through the undulations so that each final tape product will have undulations of the second mass passing in and out of the tape. This effect can also be seen in FIG. 1. At present, this is the most preferred visual effect to produce in the final product. One advantage of this effect is that the relatively random nature of the undulations produces a unique appearance at each point along the tape and also between different tapes.

As noted above, if the desired form for the chewing product is in the form of a stick of chewing gum, such as the typical 0.75×3×0.055 inch stick of chewing gum, the preferred sheeting machine is a conventional sheeting machine such as that purchased from the Gimpel Manufacturing Company. Conventional sheeting machines typically score the sheet of chewing gum on lines along the length and across the width of the sheet to thereby produce the typical 0.75×3 inch stick of chewing gum upon breaking along the score lines.

If, on the other hand, the desired product is in the preferred form of a long rolled up tape of chewing gum such as that shown in FIG. 1, the sheeting machine shown in FIG. 8 is a conventional sheeting machine which has been modified in accordance with the teachings of U.S. Pat. No. 4,882,175. In general, the modifications are that the final rollers 77 are modified so as to not score the sheet of chewing gum every 3 inches as would be normal. Instead, the final roller is modified to score the sheet of chewing gum every 6 feet. In particular, the machine is modified with respect to its lateral scoring operation. In a conventional rolling and scoring machine, the lateral scoring drum is designed to scored the gum at the desired lengths for individual sticks of gum. However, in accordance with the depicted embodiment, the lateral cutting rollers 123 are modified so as to score the sheet at much longer intervals, e.g. 6 feet. Most preferably, this is accomplished by keeping the roller with the lateral blades biased above the flat sheet until the proper time to cut the flat sheet.

Figure 14:
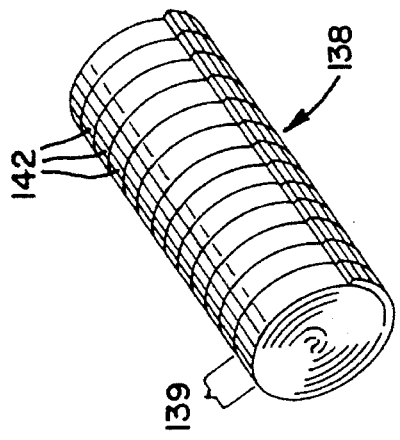
FIG. 14 is a side view showing the lateral scoring rollers, the conveyor and the rolling device for making the multi-colored chewing gum into a roller up tape in accordance with the most preferred embodiment.
Figure 15:
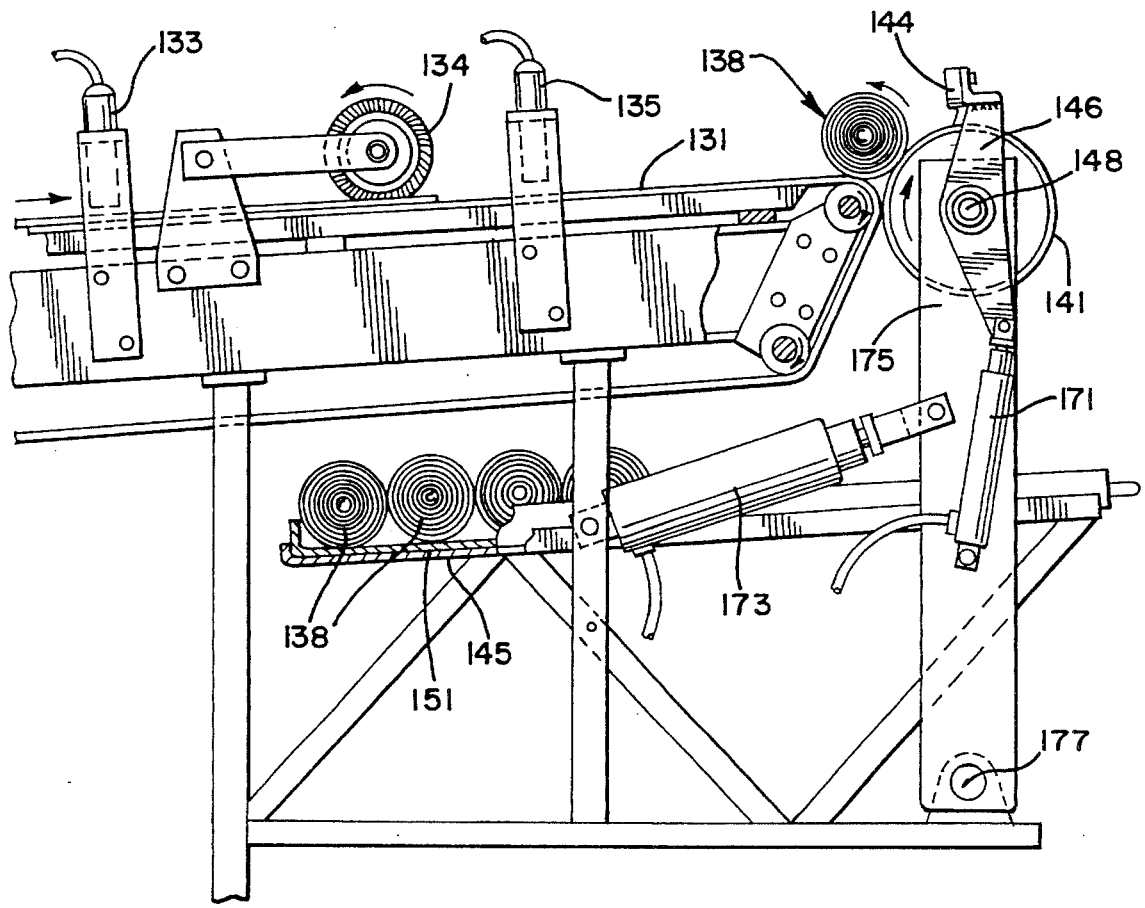
FIG. 15 is an enlarged view showing the conveyor and rolling device in FIG. 14.
Figure 16:
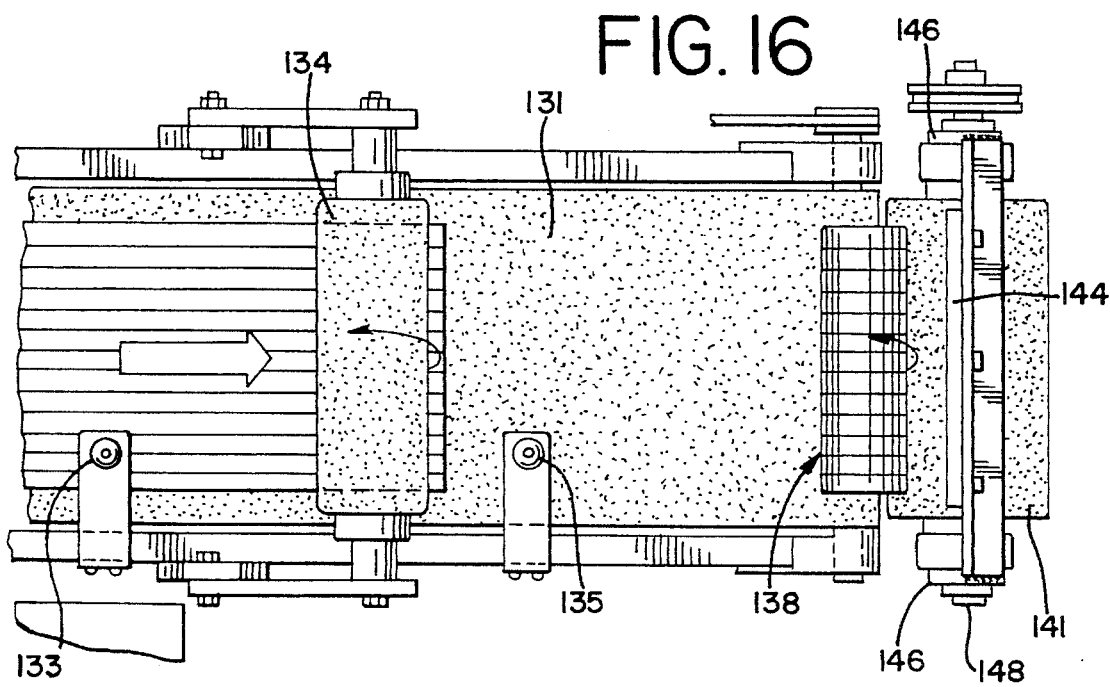
FIG. 16 is a top view of the conveyor and rolling device shown in FIG. 14.

Referring to Figure to FIG. 14, the modification in the lateral scoring increment is accomplished by removing the height adjustment screws which are ordinarily used to adjust the vertical position of the roller 123 with respect to the flat sheet. The springs 127, which are included in the conventional machine for biasing the roller into contact with the height adjusting screw, then pushes the roller 123 completely off of the flat sheet as it passes by.

Actuating means, such as an air cylinder 125 on each side of the roller, is used to push the roller 123 down at the appropriate time to cut the desired length for the tape. In the most preferred embodiment shown, the air cylinders are activated at every fourth complete revolution of the lateral cutting roller 123. At this interval, the sheet is scored at 6 foot lengths. The signal to activate the air cylinders in the depicted embodiment is provided by affixing a protrusion (not shown) to the gear which drives the roller 123. The protrusion is adapted to hit a switch. The switch is connected to a counter which counts the desired number of revolutions, most preferably 4, and then activates a solenoid valve which, in turn, activates the air cylinders 125.

The depth of the lateral score is preferably determined by a point on the journal assembly for the roller 123 coming into contact with a stop on each side of the roller. Currently, the stops as designed for the original machine are at an appropriate height. Alternatively, these stops can be replaced by screws or the like to finely adjust the depth of the cut. Most preferably, the gap left by the lateral score is approximately 0.002".

After passing under the roller 123, the sheet of confectionery product 137 is carried on a conveyor belt 131. The conveyor belt 131 is similar to that used conventionally, except that it is required to be long enough to carry the full length of the sheet. In the depicted embodiment which is adapted to make 6 foot lengths of tape, the conveyor belt 131 should be at least 7 feet long.

As with conventional stick gum making apparatus, the linear speed of the conveyor belt is intentionally set higher than the linear speed of the sheet coming out of the rollers. Preferably, the linear speed of the sheet is about 90 feet per minute as it exits the rollers, while the linear speed of the conveyor is about 130 feet per minute. As such, the conveyor 131 slides under the sheet 137 until the time at which the sheet passes under the breaking brush 134. The breaking brush is a freely-rotating, cylindrical brush which exerts sufficient downward force on the sheet so that the sheet at that point is positively engaged with the belt 131 below. When this happens, the sheet is pulled at the same speed as the conveyor and the sheet is thus broken at the lateral score line to thereby separate the sheet into the desired length for the rolled up tape.

Referring now also to FIGS. 15, 16, and 17a–d after the leading edge 136 of the sheet passes under the breaking brush 134, it continues toward a rotating drum 141.

The rotating drum is mounted on an arm 175 which pivots about the point 177. A double-acting air cylinder 173 moves the rotating drum between a rolling position, as shown in FIGS. 16 and 17a–d, and an exit position shown in FIG. 17d. The air cylinder 173 is activated into the rolling position by receiving a signal generated by proximity switch 133 which detects the leading edge 136 of the sheet passing under it. The air cylinder is moved to the exit position in response to a signal generated after a specified time, measured by a timer (not shown) has elapsed.

The rotating drum is driven by a motor and chain (not shown) preferably between about 240 and about 300 r.p.m. The surface of the rotating drum is preferably polyurethane which has been roughened to increase the friction between the drum and the sheet to be rolled. Preferably, the diameter of the rotating drum is about 4.375".

Associated with the rotating drum is a curling plate 144 which is mounted on an arm 146. The arm 146 pivots about the axle 148 for the rotating drum 141. The double-acting air cylinder 171 moves the curling plate between a curling position as shown in FIGS. 17a and 17b, and a non-engaged position as shown in FIGS. 17c and 17d. As with the rotating drum, the air cylinder 171 is activated into the curling position by receiving a signal generated by the proximity switch 135, which detects the leading edge of the sheet passing under it. The air cylinder 171 is moved to the non-engaged position in response to a signal generated after a specified time, measured by a timer (also not shown) has elapsed.

Most preferably, the curling plate 144 comprises a block of teflon with a groove cut in its length. Most preferably, the groove has a radius of 0.375". When in the curling position, the lowest point on the curling plate 144 is about 0.375" above the highest point on the conveyor 131.

FIGS. 17a–17d will now be used to explain the operation of the preferred rolling means for the present invention. FIG. 17a shows the rotating drum 141 and the curling plate 144 in place to begin rolling the sheet 137 about its leading edge 136. As the leading edge is propelled by the conveyor 131 into contact with the rotating drum 141, the leading edge is moved upward. Then, as the leading edge contacts the curved surface on the curling plate 144, it is moved in the direction opposite that of the conveyor 131. As shown in FIGS. 17a and 17b, as the conveyor and rotating drum continue to push the sheet, the sheet is rolled about the leading edge 136.

As shown in FIG. 17c, after sufficient time to get the rolling of the sheet started, the curling plate 144 is moved into the non-engaged position. This is important because the rolled up sheet will eventually have a diameter larger than would fit between the conveyor and the curling plate. Most preferably, the curling plate is moved back after 0.2 seconds, typically the time for the sheet to be wrapped 3 or 4 revolutions.

After the curling plate is moved back, the sheet is continued to be rolled by virtue of the movement of the conveyor and the rotating drum. Eventually, the sheet will be completely rolled up into a roll 138. Preferably, each 6 foot sheet is wound with about 17 revolutions. Naturally, sheets of a shorter length would be wound with fewer revolutions. At the speeds of the depicted embodiment, the rolling of each sheet takes less than 2.75 seconds to be completed.

As shown in FIG. 17d, after the roll is completed, the rotating drum is pulled back into the exit position whereupon the completed roll 138 is allowed to drop between the end of the conveyor and the drum to a tray below (not shown). Preferably, the tray is set at an angle so that the completed rolls can roll away from the point where they first fall. As such, several rolls can be collected on a tray. Once the tray is filled, it is removed and another tray is inserted to receive more falling rolls.

Figure 18:
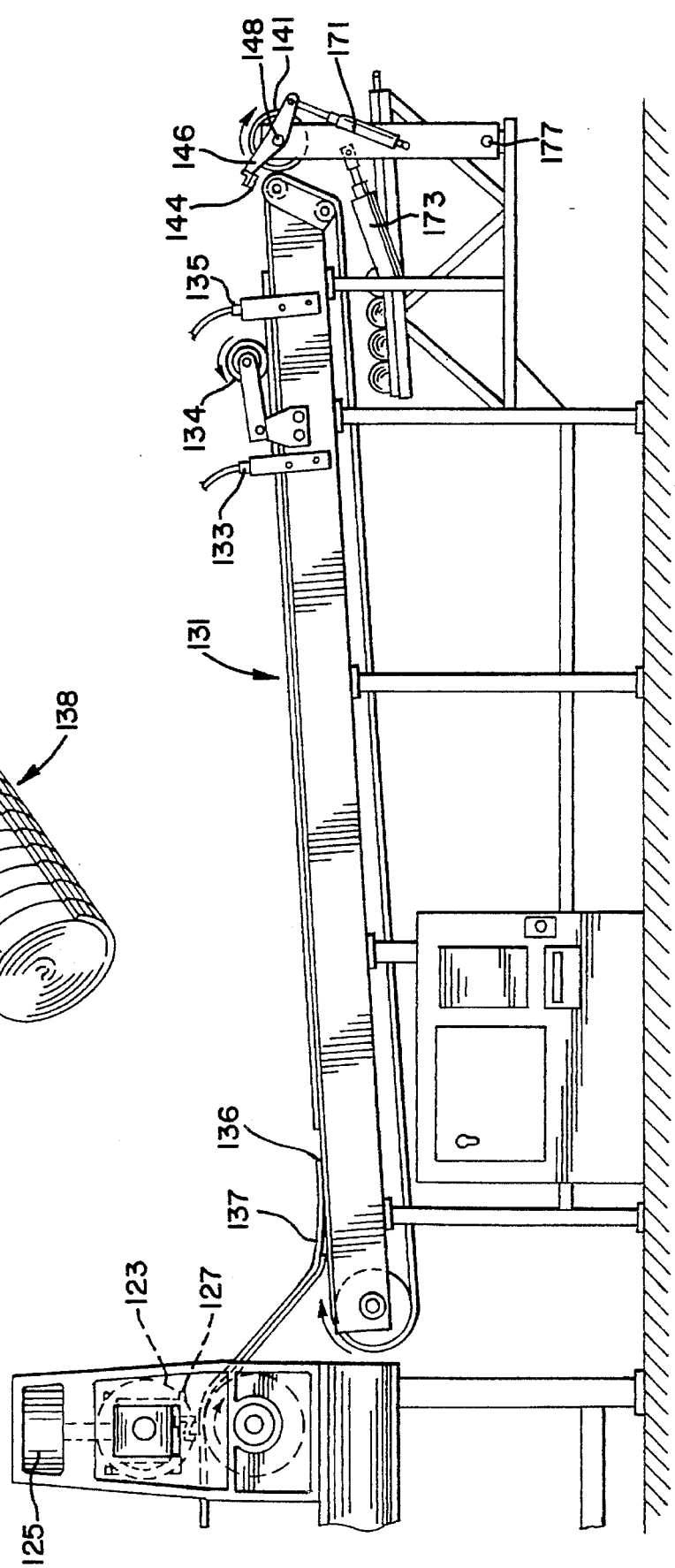
FIG. 18 is a perspective view of a pre-scored, rolled up sheet of bubble gum.

FIG. 18 shows a completed roll 138. As shown, the sheet in the roll is prescored along lines 142. It has been found that, when the sheet has been prescored in this way, the individual pieces 139 of the confectionery product are easily separated. Presently, it is preferred to pull the individual pieces of the roll apart manually. Alternatively, apparatus may be designed to perform this task.

As seen in FIGS. 4–7, the second mass of confectionery product can be laid on the first slab in several alternative patterns. For example, the embodiment shown in FIG. 3 can be made by laying ropes of the second mass on top of the slab as it passes underneath without any oscillation of the ropes.

The embodiment shown in FIG. 4 can be made by laying ropes of the second mass across the width of the slab as it passes underneath. Alternatively, if the ropes are laid in the machine direction, the sheet can be scored so that the score lines for the long edges of the chewing gum sticks run cross direction.

The embodiment shown in FIG. 5 with diagonal stripes of the second mass can be made by laying ropes of the second mass across the slab at an angle to machine direction.

The embodiment shown in FIG. 6 includes separate bits of the second mass embedded in the first mass, or in other words, islands of the second mass within the first mass. This embodiment can be made by various methods. Currently the preferred method is to form the bits of the second mass by a process known as "chipping." The bits of the second mass so formed are preferably dropped onto the Slab as it passes beneath, for example by a depositor such as that shown in FIGS. 19 and 20.

The second mass of confectionery product gum can be formed into particles of the requisite size by any means, such as chopping, extrusion, slicing and/or scoring.

Preferably, particles of chewing gum are formed by a method that can be described as chipping. In accordance with this chipping method, a mass of chewing gum is made by conventional techniques. The mass of chewing gum is cured at ambient temperature for at least about 4 hours and then sheeted by conventional means to sheets which are about 1.4 mm thick, 248 mm wide and 425 mm long. As is customary in the chewing gum making art, the chewing gum is coated with a dusting agent during the sheeting process. Preferably, the dusting agent is selected from the group consisting of powdered sugar, corn starch, magnesium stearate, calcium stearate and combinations thereof. Most preferably, the dusting agent comprises corn starch.

Preferably, the sheets of chewing are then cooled to a temperature below about 18.3° C. and more preferably to a temperature between about 12.7° and about 18.3° C., most preferably to a temperature of about 14.4° C. It has been found that this cooling step improves the chipping process for the chewing gum.

These cooled sheets are then passed through a chipping machine which has two chipper heads. Each chipper head is made up of a series of about 57 blades which are each about 57 mm in diameter and about 3.2 mm wide. Each chipper blade is spaced from the next blade by a spacer of the same width and with a reduced diameter. Each blade includes a series of ridges which protrude radially about 0.8 mm above the surface of the blade. The two chipping heads are arranged so that the blades of one head are lined up with the spacers of the other head. Also, the heads are arranged so that the blades are intermeshed. In other words, the blades of one head overlap with the blades of the other.

In operation, the chipping machine is set up so that the chipping heads are rotated in opposite directions and a sheet of the bubble gum is fed between the chipping heads. The rotation of the chipping heads pulls the sheet through and the intermesh of the blades shreds the sheet lengthwise in strips about 3.2 mm wide. Also, the ridges on each of the blades scores the strips of chewing gum at 3.2 mm intervals.

The scored shreds of chewing gum are then transferred to a ribbon blender wherein the shreds are more assuredly separated into individual pieces about 3.2 mm square. Typically, the shreds are blended for about 5 minutes. It is also preferable to add a dusting agent to the shreds in the ribbon blender. Adding the dusting agent to the ribbon blender coats the raw edges created during the separation process taking place in the ribbon blender, thus reducing the tendency toward agglomeration. Most preferably, corn starch is added to the shreds in the ribbon blender at about 7 percent by weight of the shreds.

As the chewing gum particles exit the ribbon blender, they are made to pass through a screen with openings slightly larger than 3.2 mm. After passing through the screen, the particles are transferred to the bin of the depositing device shown in FIGS. 14 and 15.

As an alternative to using a separate chipping machine, a conventional sheeting machine can be modified to include scoring rolls with ridges designed to score the sheet at the desired intervals.

The shape of the chewing gum particles is not seen to be critical. As a product of the chipping method described above, the most preferred shape is a rectangular block which measures about 3.2 mm×3.2 mm×1.4 min. Alternatively, other shapes such as spheres and irregular shapes can be used.

Once obtained, the bits of chewing gum can be deposited on top of the slab of the first chewing gum mass in various ways. Most preferably, the bits are deposited by a device such as that shown in FIGS. 19 and 20. In operation, the device 140 has a bin 142 which is loaded with bits of chewing gum. The bit 142 has a sloped bottom wall which directs the bits of chewing gum toward the opening 145. Mounted within the opening 145 is a depositing roller 146 which is rotated about its axis at a predetermined rate and includes several depressions 148 on its surface. The depressions 148 are sized so as to allow a single chewing gum bit 150 to fit within it and thereby pass out of the bin 142 as the roller rotates. As the roller continues to rotate, the chewing gum bit falls out of the depression 148 and onto the slab 152 beneath it. In this way, the chewing gum bits are deposited in a regular pattern on the surface of the slab. Once deposited, the bits are preferably embedded within the slab by passing through roller on top of the slab. The slab can then be run through a conventional sheeting machine such as that shown in FIG. 8.

The embodiment shown in FIG. 7 is made similar to that shown in FIG. 6 with the exception that instead of scoring the sheet to produce conventional sticks of chewing gum, the sheet is cut into disks. Preferably, the die cutting the disks also includes means for scoring the disk radially so as to provide the appearance of slices, e.g. bubble gum pizza slices.,

EXAMPLES

The following examples are provided by way of explanation and illustration. As such, these examples are not to be viewed as limiting the scope of the invention as defined by the appended claims.

EXAMPLE 1

Example 1 is carried out according to the most preferred embodiment of the present invention. In particular, a first and second mass of bubble gum is made according to the formulations described above. These masses of bubble gum are made up made by the conventional methods. The bubble gum is then cured for about 2 hours.

The first mass, which is red in color, is extruded at a rate of about 18 feet per minute in a slab about 0.375 inches thick and about 12 inches wide.

The second mass, which is yellow in color, is extruded into ropes by the apparatus shown in FIGS. 8–12 at a rate of about 12 feed per minute at a diameter of about 0.25 inches. The roller is oscillated a distance of about 2 inches at a rate of about 28 cycles per second.

The slab with the ropes on top of it is passed through the sheeting machine described above. The resultant sheet is about 0.055 inches thick and is scored at 0.75 intervals and cut every six feet of length. This scored sheet is rolled up on the apparatus shown in U.S. Pat. No. 4,882,175 referred to above. The individual tapes are separated and the product is packaged in a cylindrical cup with a lid such as that shown in this patent.

EXAMPLE 2

Example 2 is carried out the same as Example 1 except that the high potency sweeteners are removed from the formulation for the first slab. No change in the extrusion or sheeting operations are observed.

EXAMPLE 3

Example 3 is carried out the same as Example 1 except that a candy formulation is used for the second mass. In particular, the formulation had the following ingredients in the amounts shown:

| Ingredient | Wt. % |
| --- | --- |
| Corn Syrup | 40.8 |
| Sugar | 38.4 |
| Lecithin | 0.6 |
| Vegetable Shortening | 7.7 |
| Nonfat Dry Milk | 4.8 |
| Water | 2.7 |
| Salt | 0.2 |
| Emulsifier | 1.0 |
| Colors | 2.3 |
| Artificial Flavors | 0.1 |
| Artificial Fondant | 1.4 |
| Total | 100.00 |

The first 9 ingredients in this list are blended in a steam jacketed kettle at a temperature of about 250° F. with constant agitation. After the ingredients are blended, the steam is turned off and water is run through the jacket. The agitation is continued while the blend cools to about 140° F. At this point, the flavors and fondant are added with beating to blend in thoroughly. The mixture is put into tubs and cured in a hot room (approximate 100° F.). The resultant candy mass is fed into the second extruder, such as that shown above and extruded as undulating stripes on top of a bubble gum slab.

It should be noted that although much of the discussion has involved the use of chewing gum for the second mass of confectionery product, other confectionery products can also be used. Also, although bubble gum is preferred and has been described in most detail, other forms of chewing gum, sugar containing or sugarless, can also be used. Certainly, these and all other modifications which are within the ordinary skill in the art to make are considered to lie within the scope of the invention as defined by the appended claims.

We claim:

1. A method for making a multi-phase chewing gum product, comprising the steps of:

forming a first mass of chewing gum into a slab with a first generally flat surface and a second surface;

forming a second mass of a confectionery material;

placing the second mass in contact with the first generally flat surface of the first mass in a pattern selected from the group consisting of an undulating pattern, a pattern of stripes across the first surface, a diagonal pattern, a pattern of bits, and combinations of the foregoing;

pressing the second mass into the first surface of the first mass, to produce a generally flat sheet having first and second surface, wherein the first and second masses are visible from the first surface of the sheet and the second mass is not visible from the second surface of the sheet; and cutting said generally flat sheet into segments of a desired width, length and shape, wherein each of said segments includes some of said first mass with some of said second mass embedded therein in said pattern.

2. The method of claim 1 wherein the second mass is formed as a plurality of ropes, and the ropes are laid across the first surface of the first mass formed into a slab.

3. The method of claim 2 wherein a plurality of ropes are laid on top of the slab in a direction generally diagonal to the length of the continuous slab.

4. The method of claim 2 wherein the plurality of ropes are laid in a generally undulating pattern.

5. The method of claim 4 wherein the undulating pattern is produced by oscillating the ropes a desired distance across the width of the slab as the ropes are laid on the slab.

6. The method of claim 4 or 5 wherein the generally flat sheet is cut into sticks of chewing gum.

7. The method of claim 4 or 5 wherein the generally flat sheet is formed into a plurality of rolled tapes.

8. The method of claim 2 wherein the plurality of ropes are laid in a direction generally transverse to the length of the continuous slab.

9. The method of claim 1 wherein the second mass is formed into a plurality of particles which are laid on the slab as it passes beneath.

10. The method of claim 9 wherein the particles are of a generally uniform size and shape.

11. The method of claim 9 wherein the particles are nonuniform in size and shape.

12. The method of claim 9 wherein the generally flat sheet is cut into a plurality of disks.

13. The method of claim 1 wherein a rolling compound is placed between the first mass of chewing gum and the second mass of confectionery material so that the two are separable by the consumer.

14. The method of claim 1 wherein no rolling compound is placed between the first mass of chewing gum and the second mass of confectionery material so that the two are not separable by the consumer.

15. A method of making a multi-phase strip of chewing gum comprising the steps of:

extruding a first chewing gum into a continuous slab;

extruding a second chewing gum with at least one observable property different from the first chewing gum into at least one rope;

laying the rope on top of the slab;

passing the slab and rope through a series of rollers to thereby produce a generally flat sheet comprising the first chewing gum with the second chewing gum embedded, yet visible therein;

cutting the sheet into strips of chewing gum of a desired length and width, wherein each strip includes some of said first chewing gum with said second chewing gum embedded therein.

16. The method of claim 15 wherein a plurality of ropes of the second chewing gum are laid on top of the slab.

17. The method of claim 16 wherein the plurality of ropes are laid on top of the slab in a direction generally parallel to the length of the continuous slab.

18. The method of claim 17 wherein the plurality of ropes are laid in a generally undulating pattern.

19. The method of claim 18 wherein the undulating pattern is produced by oscillating the ropes a desired distance across the width of the slab as the ropes are laid on the slab.

20. The method of claim 18 or 19 wherein the generally flat sheet is cut into sticks of chewing gum.

21. The method of claim 18 or 19 wherein the generally flat sheet is formed into a plurality of rolled tapes.

22. The method of claim 15 wherein the plurality of ropes are laid in a direction generally transverse to the length of the continuous slab.

23. The method of claim 15 wherein a plurality of ropes are laid generally diagonally across the slab as it passes beneath.

24. A method for making a multi-phase chewing gum product, comprising the steps of:

extruding a first mass of chewing gum into a slab having a first generally flat surface and a second surface;

guiding a plurality of streams of a second mass of a confectionery material using one or more guide rollers having a plurality of channels formed therein, into contact with the first generally flat surface of the first mass, in a pattern corresponding to a movement of the rollers relative to the first surface and locations of channels in the guide rollers;

pressing the second mass into the first mass to form a sheet having first and second surfaces; and cutting the sheet into pieces of chewing gum having said pattern of said second mass embedded into the first mass.

25. The method of claim 24, wherein said pattern is selected from the group consisting of an undulating pattern, a pattern of stripes, a diagonal pattern, and combinations of the foregoing.

26. The method of claim 24, wherein the plurality of streams of second mass comprises a plurality of ropes.

27. The method of claim 24, further comprising the step of oscillating said guide roller a desired distance across the slab.

28. The method of claim 27, wherein the roller is oscillated using pneumatic pistons.

29. A method for making a multi-phase chewing gum product, comprising the steps of:

extruding a first mass of chewing gum into a slab having a first generally flat surface and a second surface;

depositing a plurality of bits of a second mass of a confectionery material using at least one deposition roller having a plurality of openings formed therein, into contact with the first generally flat surface of the first mass, in a pattern corresponding to a movement of the roller relative to the first surface and locations of openings in the roller;

pressing the second mass into the first mass to form a sheet having first and second surfaces; and cutting the sheet into pieces of chewing gum having said pattern of said second mass embedded into the first mass.

30. The method of claim 29, further comprising the step of oscillating said roller a desired distance across the slab.

31. The method of claim 29, wherein said bits have a generally uniform shape and size.

32. The method of claim 29, wherein said bits have a nonuniform shape and size.

* * * * *

UNITED STATES PATENT AND TRADEMARK OFFICE
CERTIFICATE OF CORRECTION

PATENT NO. : 5,538,742
DATED : July 23, 1996
INVENTOR(S) : Michael McHale et al.

It is certified that error appears in the above-indentified patent and that said Letters Patent is hereby corrected as shown below:

Title page, item [54], and column 1, lines 1, 2, & 3.

In each occurrence of the title, delete "MULTI-PHASE SHEETED CHEWING GUM AND METHOD AND APPARATUS FOR MAKING" and substitute --METHOD OF MAKING MULTI-PHASE SHEETED CHEWING GUM--.

In column 1, line 25, delete "Thumb Suckers" and substitute --THUMB SUCKERS--.

In column 1, line 28, delete "Blow Pops" and substitute --BLOW POPS®--.

In column 1, line 31, delete "Tidal Wave" and substitute --TIDAL WAVE--.

In column 1, lines 39 and 40, delete "Fruit Stripes" and substitute --FRUIT STRIPES--.

In column 2, line 16, after the first "some", delete --.--.

In column 2, line 49, delete "Bubble Tape®" and substitute --"BUBBLE TAPE®"--.

UNITED STATES PATENT AND TRADEMARK OFFICE
CERTIFICATE OF CORRECTION

PATENT NO. : 5,538,742
DATED : July 23, 1996
INVENTOR(S) : Michael McHale et al.

It is certified that error appears in the above-indentified patent and that said Letters Patent is hereby corrected as shown below:

In column 3, line 21, after "second", delete "-".

In column 4, line 6, after the second occurrence of "is", insert --,--.

In column 4, lines 54 and 55, delete "Domino's Pizza® Bubble Gum" and substitute --DOMINO'S PIZZA® BUBBLE GUM--.

In column 4, line 59, after the first occurrence of "chewing", insert --gum--.

In column 6, line 7, delete "63" and substitute --83--.

In column 6, line 21, after "Teflon", insert --®--.

In column 6, line 24, after "Teflon", insert --®--.

In column 6, line 48, delete "63" and substitute --83--.

In column 7, line 5, after "product", delete ":" and substitute --.--.

In column 7, line 63, delete "scored" and substitute --score--.

In column 8, line 3, delete "Figure to".

UNITED STATES PATENT AND TRADEMARK OFFICE
CERTIFICATE OF CORRECTION

PATENT NO.  :  5,538,742
DATED       :  July 23, 1996
INVENTOR(S) :  Michael McHale et al.

It is certified that error appears in the above-indentified patent and that said Letters Patent is hereby corrected as shown below:

In column 9, line 21, delete "teflon" and substitute --Teflon®--.

In column 9, line 65 after "way,", delete ".".

In column 10, line 17 after "to", insert --the--.

In column 10, line 24, delete "Slab" and substitute --slab--.

In column 10, line 43 after "chewing", insert --gum--.

In column 11, line 24, delete "min." and substitute --mm.--.

In column 11, line 44 after "through", insert --the--.

In column 11, line 53 after "slices.", delete ",".

In column 12, line 1, delete "made up".

In column 12, line 8, delete "feed" and substitute --feet--.

Signed and Sealed this

Twenty-eighth Day of October, 1997

BRUCE LEHMAN

*Attest:*

*Attesting Officer*    *Commissioner of Patents and Trademarks*